United States Patent [19]

Ekhoff

[11] Patent Number: 5,056,082
[45] Date of Patent: Oct. 8, 1991

[54] APPARATUS FOR CLAMPING REMOVABLE DISKS

[76] Inventor: Donald L. Ekhoff, 2600 Day Rd., Gilroy, Calif. 95020

[21] Appl. No.: 365,097

[22] Filed: Jun. 12, 1989

[51] Int. Cl.$^5$ .................. G01D 15/28; G11B 17/02
[52] U.S. Cl. .................... 369/270; 369/271; 360/99.05; 360/99.12
[58] Field of Search ............... 369/270, 271; 360/92, 360/98.04, 98.05, 98.06, 98.08, 99.05, 99.12, 99.02, 105, 135, 133, 98.04, 98.12, 97.01–97.05

[56] References Cited

U.S. PATENT DOCUMENTS

| | | | |
|---|---|---|---|
| 3,867,724 | 2/1975 | Bruer et al. | 360/99.12 X |
| 4,125,883 | 11/1978 | Rolph | 360/99 |
| 4,171,531 | 10/1979 | Grapes et al. | 360/99 |
| 4,232,870 | 11/1980 | Iemenschot | 274/39 R |
| 4,376,997 | 3/1983 | Eggers | 369/270 |
| 4,409,629 | 10/1983 | Puls | 360/99.05 |
| 4,413,294 | 11/1983 | Beijer | 360/99.05 X |
| 4,420,830 | 12/1983 | Green | 360/99.05 X |
| 4,430,678 | 2/1984 | Hack et al. | 360/99.05 |
| 4,705,279 | 11/1987 | Mizukami et al. | 360/99.05 X |
| 4,723,648 | 2/1988 | Hamatani | 360/99.12 X |
| 4,737,948 | 4/1988 | Okita | 360/99.05 X |
| 4,755,981 | 7/1988 | Ekhoff | 369/270 |
| 4,881,745 | 11/1989 | Peters | 360/99.12 X |

FOREIGN PATENT DOCUMENTS

240472 4/1985 Japan.

Primary Examiner—Paul Ip
Attorney, Agent, or Firm—Schneck & McHugh

[57] ABSTRACT

A spindle clamp for removably supporting a data disk wherein the clamp has a spindle adapted for rotation about a vertical axis. The top of the spindle is stepped, having an inner raised surface, an intermediate gap-forming surface and an outer disk-seating surface. A segmented annular jaw assembly rests atop the raised surface and forms an annulus having an outer diameter less than the inside diameter of the data disk. The radially inward portion of the jaw assembly has an inverted and truncated conical bearing surface in frictional contact with a conforming wedge surface of a cam member. Downward displacement of the cam member causes the wedge surface to move the individual segments of the jaw assembly in a radially outward direction. The cam member is moved pneumatically from a disk-releasing position to a lower disk-clamping position that positions the edges of the individual segments of the jaw assembly above the data disk. Simultaneously, the cam member contacts a portion of a load transfer member spatially situated between the cam member and the jaw assembly. Interaction of the cam member, the load transfer member and the jaw assembly forces the jaw assembly onto the upper surface of the data disk, thereby securing the data disk to the spindle.

23 Claims, 5 Drawing Sheets

APPARATUS FOR CLAMPING REMOVABLE DISKS

DESCRIPTION

1. Technical Field

The present invention relates to clamping devices adapted for supporting and releasing a disk and in particular to spindle clamps for removably supporting a disk for rotation about an axis, where the disk has a central aperture.

2. Background Art

U.S. Pat. No. 4,125,883 to Rolph and U.S. Pat. No. 4,171,531 to Grapes et al. disclose devices for clamping recording media disks. The clamping devices include conical members which enter a mounting aperture in the center of a disk from a direction above the disk. The periphery of the conical member frictionally contacts the mounting aperture of the disk to center the disk for rotation about a vertical axis.

In the quality control testing of magnetic and optical data disks, rapid robotic removal of a tested disk from a drive spindle followed by replacement with a disk to be tested is the preferred process. Moreover, because of the associated centrifugal force and because it is desirable to quality test data disks under the same conditions as will be experienced in actual use, top clamping devices such as those noted above are preferred. Such top clamping devices, however, require two "handed" robotics, one hand controlling the top clamping device and the other handling the disk. This two-handed process increases the expense and the time requirements of the robotic apparatus. Likewise, the clamping device disclosed in U.S. Pat. No. 4,232,870 to Iemenschot requires a two-handed procedure in changing video records. While the above-mentioned clamping devices accomplish their intended purpose, the devices are inadequate for applications such as quality control testing in which rapid interchangability of disks is at a premium.

It is an object of the present invention to provide a top clamping apparatus for securing a magnetic or optical data disk to a rotational drive spindle. Another object is to provide such an apparatus which permits "one-handed" robotic removal of a disk from the spindle.

DISCLOSURE OF THE INVENTION

The above objects have been met by a clamping apparatus which is part of the drive spindle assembly and, yet, which secures a data disk from above the disk. The clamping apparatus includes a jaw assembly having a diameter less than the central aperture of the disk, so that the data disk may be fit over the jaw assembly with little of no contact with the jaw assembly. After mounting of the disk on a spindle, the jaw assembly is provided with a first component of motion such that the outer periphery of the jaw assembly extends beyond the central aperture of the disk. The jaw assembly is then provided with a second component of motion which, depending upon the embodiment, either elastically deforms the outer periphery to press against the upper surface of the disk or overcomes a biasing force that previously maintained the outer periphery in a position in nominal contact with or in spaced relation to the upper surface of the disk.

The spindle is adapted for rotation about a vertical axis and has a raised surface and a recessed disk-seating surface perpendicular to an axis of rotation. The diameter of the raised surface is less than the diameter of the central aperture of a disk, while the disk-seating surface has a diameter exceeding that of the disk. The jaw is a segmented assembly which forms an annular configuration when the jaw segments are placed in a side-by-side relation An elastic O-ring or a plurality of springs bias the jaw assembly into the annular configuration.

A radially inward portion of the jaw assembly has an inverted and truncated conical bearing surface. A wedge portion of a cam member rests within the conical bearing surface of the jaw assembly. An axial drawbar is fixed to the cam member and may be displaced vertically to move the cam member from a disk-releasing position to a disk-clamping position. Motion into the disk-clamping position is in a downward direction and the frictional engagement of the wedge portion of the cam member with the truncated conical bearing surface of the jaw assembly causes the individual jaw pieces to be moved in a direction that is perpendicular to the motion of the cam member. That is, the jaw pieces slide horizontally across the raised surface of the spindle. This expansion of the jaw assembly extends a portion of each of the jaw pieces over the upper surface of the disk.

A load transfer member is positioned between the cam member and the jaw assembly Initially the load transfer member is spaced apart from the cam member. However, as the cam member reaches the disk-clamping position, the cam member is brought into contact with the load transfer member In this manner, the cam member exerts a force onto the radially outward portion of the jaw assembly, via the load transfer member, to move the jaw assembly into contact with the disk so as to securely clamp the disk to the drive spindle.

The jaw assembly is made of a slippery, nonparticulating material Thus, the assembly does not require use of oil and does not create dust. Both oil and dust may damage a data disk.

An advantage of the present invention is that the clamping apparatus may be moved between a disk-releasing position and a disk-clamping position by pneumatic pressure. Thus, the only robotic arm motion required in the exchange of data disks is that of lifting and lowering the disks.

BEST MODE FOR CARRYING OUT THE INVENTION

Figure 1:
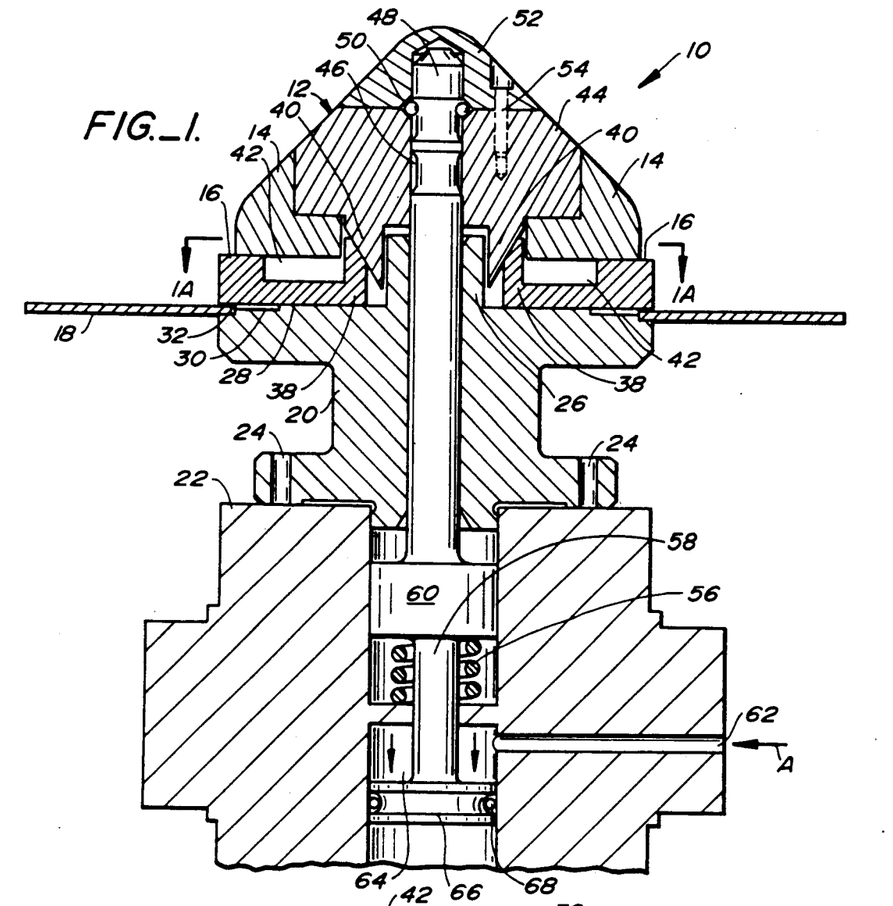
FIG. 1 a side sectional view of a spindle clamping apparatus in accord with the present invention, shown in a disk-clamping position.
Figure 1A:
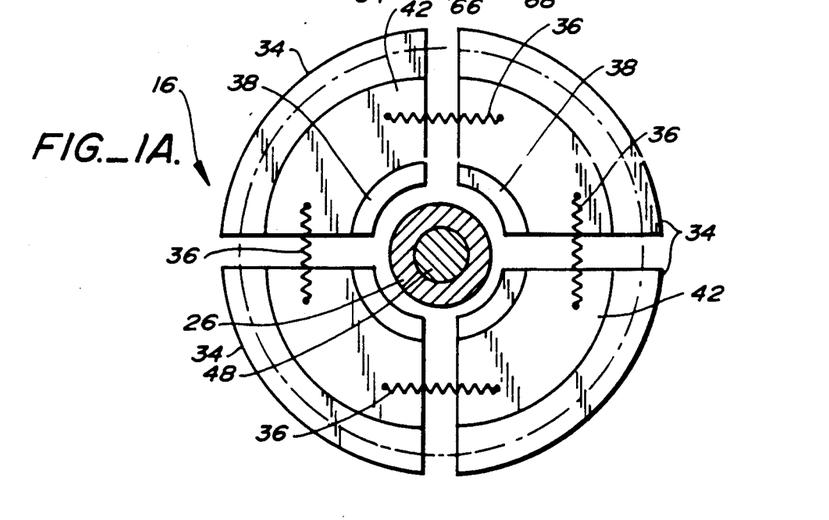
FIG. 1A is a top view of a jaw assembly of FIG. 1 taken along lines 1A—1A.

With reference to FIGS. 1 and 1A, a spindle clamp 10 includes a cone cam 12, an annular load transfer member 14, and a segmented jaw assembly 16. As will be set forth below, the cone cam, the load transfer member and the jaw assembly interact to secure a disk 18 against a cylindrical spindle 20. The disk 18 is typically a record medium, such as a magnetic or optical data disk. Disks of this type are well known and usually have a central aperture of a predetermined inside diameter A standard inside diameter for data disks is 40.0 mm.

The spindle 20 is fixed to a turntable 22 which is driven to rotate the spindle, and therefore the disk 18 about a central axis of rotation Apertures 24 at the base of the spindle 20 receive bolts, not shown, to secure the spindle to the turntable 22. The apertures 24 are part of an array of apertures, only a few of which are aligned with internally threaded holes, not shown, in the turntable.

At the top of the spindle 20 is a central hub 26 and a stepped region that includes a raised surface 28, a gap-forming surface 30 and a disk-seating surface 32. The segmented jaw assembly 16 rests atop the raised surface 28 and extends above the gap-forming surface 30 and the recessed disk-seating surface 32. Each of the surfaces 28, 30 and 32 are annular. The outside diameter of the gap-forming surface 30 is slightly less than the inside diameter of the disk 18 so that the disk fits over the surface 30. The outside diameter of the disk-seating surface 32, on the other hand, exceeds the inside diameter of the disk so that the disk rests atop the surface 32.

As shown in FIG. 1A, the jaw assembly 16 is a segmented assembly having a plurality of jaw pieces 34. Adjacent jaw pieces 34 are biased into side-by-side relation by helical springs 36. Originally, the jaw assembly is a unitary body having an annular shape. However, the jaw assembly is segmented, for example, by radial sawing, into the individual jaw pieces 34. While four jaw pieces are shown, the number of pieces may vary.

The radially inward portion 38 of the individual jaw pieces 34 project upwardly and, as best seen in FIG. 1, have an inclined bearing surface which conforms to the wedge surface of a wedge portion 40 extending downwardly from the cone cam 12. Preferably, the contacting surfaces of the radially inward portion 38 of the jaw pieces and the wedge portion of the cone cam are at a 45° angle to the horizontal. The intermediate area of the individual jaw pieces 34 is recessed to provide a channel 42 for holding the helical springs 36 therein. The radially outward portion of the jaw assembly 16 again projects upwardly to support the annular load transfer member 14.

The wedge portion 40 of the cone cam 12 is an integral part of the lower segment 44 that makes up the cone cam. In assembling the spindle clamp 10, an axial bore 46 within the lower segment 44 slidably receives a drawbar 48. A number of bearing members 50 are arranged to contact the drawbar 48, whereafter an upper segment 52 of the cone cam is fitted to cap the drawbar. A plurality of bolts, not shown, are received within apertures 54 to secure the upper segment 52 to the lower segment 44. Thus, displacement of the drawbar 48 causes axial displacement of the cone cam 12 via the bearing members 50.

Figure 2:
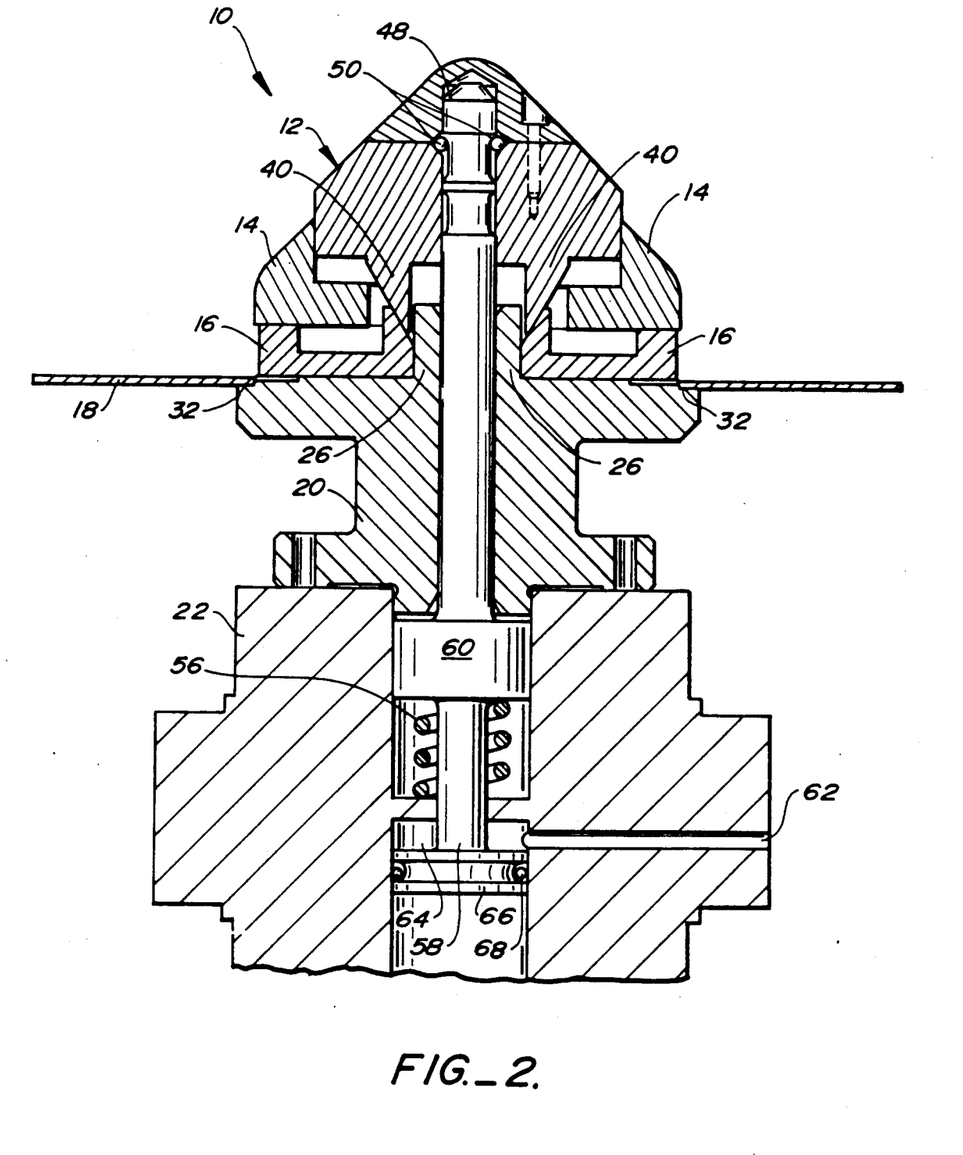
FIG. 2 is a side sectional view of the spindle clamping apparatus of FIG. 1 shown in a disk-releasing position.

Referring now to FIG. 2, a spring member 56 within the turntable 22 biases the drawbar 48, and therefore the cone cam 12, into an upwardly extended state. The spring member 56 is fitted about a piston rod 58 and urges a plunger 60 upwardly. Consequently, the spindle clamp 10 is pressed into the disk-releasing position shown in FIG. 2. In this position, only the narrow tip of the cone cam wedge portion 40 contacts the individual pieces of the segmented jaw assembly 16. The helical springs which bias the individual pieces of the jaw assembly relax and bring the jaw pieces into side-by-side relation. The jaw assembly 16 thereby slides horizontally across the upper surface of the spindle 20 and comes to rest against the central hub 26 of the spindle. In a relaxed condition, the diameter of the jaw assembly 16 is less than the inside diameter of a disk 18, permitting removal of the disk without interference from the spindle clamp 10.

In the operation of quality control testing of the data disk, a disk is robotically inserted onto the annular disk-seating surface 32 of the spindle 20. This may be done with little or no contact between the inner rim of the disk and either the load transfer member 14 or the segmented jaw assembly 16 After positioning of the disk onto the spindle 20, a stream of gas, such as air, is channeled from a gas supply, not shown, to an inlet 62 of the turntable 22. As shown by arrow A in FIG. 1, the gas is channeled into the inlet whereupon it collects within a chamber 64. Gas pressure builds to exert a force onto a piston 66 at the end of the piston rod 58. An O-ring 68 insures a fluid-tight seal. When the gas pressure against the piston 66 exceeds the bias of the spring member 56, the drawbar 48 is caused to move downwardly. Vertical displacement of the drawbar is translated to the cone cam 12 via the bearing members 50.

Initially, the cone cam 12 is spaced apart from that portion of the annular load transfer member 14 which is below the cone cam Thus, as the cone cam begins to move downwardly, the cone cam provides only a first component of motion to the individual pieces of the jaw assembly 16. This component of motion is provided by the frictional contact of the wedge portion 40 with the inclined surface of the jaw assembly and is a horizontal component across the raised surface 28 of the spindle 20. Because the planes defined by the planar raised surface 28 and the planar disk-seating surface 32 are spaced apart by a distance greater than the height of the data disk 18, the lower surface of the jaw assembly optimally does not contact the surface of the data disk as the individual jaw pieces slide over the disk. Eventually, however, a horizontal surface of the cone cam 12 comes into contact with a horizontal surface of the annular load transfer member 14 to provide a second component of motion to the jaw assembly The force of the cone cam as it is drawn downwardly is exerted onto the load transfer member which, in turn, provides a force to the radially outward portion of the jaw assembly.

The gap-forming surface 30 of the spindle 20 is recessed relative to the raised surface 28 of the spindle, thereby providing a gap between the surface 30 and the jaw assembly 16. This gap facilitates bending of the jaw assembly by the force received via the annular load transfer member 14. The jaw assembly 16 is made of an elastically deformable material which is slippery and nonparticulating. The property of being elastically deformable is of importance since in a relaxed state the jaw assembly does not contact the data disk 18 even when fully extended radially outwardly. In the disk-clamping position shown in FIG. 1, the force of the load transfer member 14 against the jaw assembly bends the jaw assembly down onto the data disk. Typically, this deformation should be approximately 1 to 2 mils. The jaw assembly should be slippery since the individual jaw pieces must slide over the raised surface 28 of the spindle 20 without requiring oil. Oil is detrimental to the data disk. Likewise, dust will damage the data disk and consequently the jaw assembly should be nonparticulating. Materials possessing the desired properties are well known in the field. For example, a synthetic resin polymer sold under the trademark Teflon may be used.

Preferably, the disk-seating surface 32 of the spindle 20 is approximately 5 mm in width, and the jaw assembly 16 provides a pressure of approximately 100 psi onto the data disk 18. That is, the spindle clamp 10 should approximate the conditions which will be experienced by a data disk during regular use by a consumer.

Figure 3:
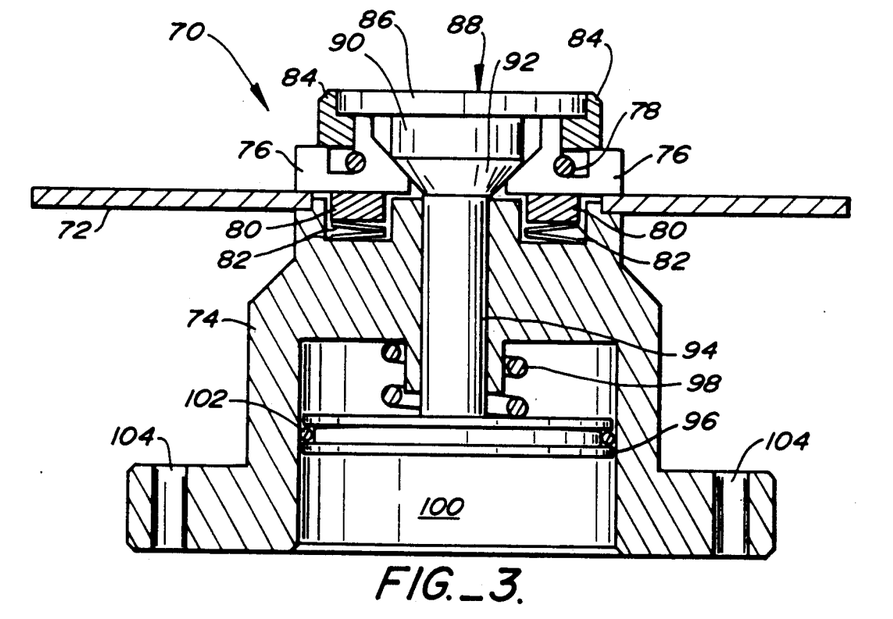
FIG. 3 is a second embodiment of a spindle clamping apparatus in accord with the present invention.
Figure 4:
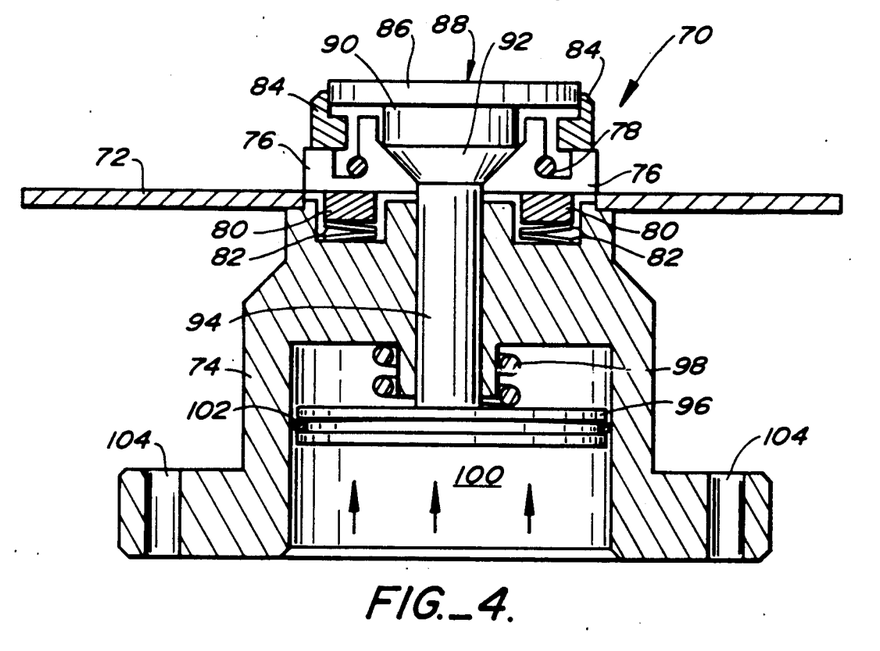
FIG. 4 is a side sectional view of the apparatus of FIG. 3 shown in a disk-releasing position.

FIGS. 3 and 4 illustrate a second embodiment of the present invention, with FIG. 3 showing a spindle clamp 70 in a disk-clamping position and FIG. 4 showing a disk-releasing position. In the disk-clamping position, a data disk 72 is secured to a spindle 74 by a jaw assembly 76. Again, the jaw assembly 76 is a segmented assembly which forms an annular configuration when the individual jaw pieces are placed in side-by-side relation. The jaw assembly is biased in this annular configuration by an O-ring spring 78. The O-ring spring is typically silicon rubber, but other elastic materials may be used.

In the disk-releasing position of FIG. 4, the O-ring spring 78 holds a jaw assembly 76 in an annular shape. The outside diameter of the jaw assembly is less than the inside diameter of the data disk 72, permitting removal of the data disk without interference. The lower surface of the jaw assembly is a flat clamping surface which defines a plane that is above the plane of the data disk 72. The jaw assembly is held upwardly by a biased support ring 80. A number of belleville springs 82 urge the support ring 80 against the jaw assembly 76. The number of belleville springs depends upon the thickness of the data disk so that the spindle clamp 70 may be adapted for various size disks. The top surface of the biased support ring 80 is a raised surface relative to the disk-seating surface of the spindle 74 upon which the data disk rests.

The radially outward portion of the jaw assembly 76 projects upwardly and seats an annular load transfer member 84. In the disk-releasing position of FIG. 4, the load transfer member is in frictional contact with the circumference of a disk-shaped head 86, but is in spaced relation to the disk-shaped head in the vertical direction. The disk-shaped head is part of a cam member 88 having a cylindrical section 90 and an inverted and truncated conical section 92. The truncated conical section 92 projects from a draw bar 94 adapted for axial displacement by movement of a piston 96. The piston is biased into the disk-clamping position by a helical spring 98 having opposed ends abutting the spindle 74 and the piston. As shown in FIG. 4, the bias of the helical spring 98 may be overcome by injection of gas, typically air, into a spindle chamber 100 below the piston 96. An O-ring 102 encircles the piston to insure a fluid tight seal.

In operation, the spindle clamp 70 is secured to a turntable, not shown, by the passage of bolts through apertures 104 at the base of the spindle 74, whereafter the bolts are received within internally threaded orifices of the turntable. Air is injected into the spindle chamber 100 below the piston 96 to move the spindle clamp 70 into the disk-releasing position of FIG. 4. Thus, it is possible to robotically seat a data disk 72 on the spindle 74 using a "one-handed" process. This is true since the data disk is clamped in position and later released by controlling the flow of air into the spindle chamber 100.

After seating of the data disk on the spindle air pressure within the spindle chamber is decreased and the bias of helical spring 98 begins to move the cam member 88 downwardly. The truncated conical section 92 of the cam member frictionally engages a conforming surface of the jaw assembly 76. Consequently, vertical displacement of the truncated conical section causes horizontal displacement of the individual pieces of the jaw assembly 76.

As shown in FIG. 3, the jaw assembly moves horizontally across the top surface of the bias support ring 80 until the radially outward portion extends over the data disk 72. Simultaneously, the disk-shaped head 86 contacts the horizontal surface of the load transfer member. Further downward movement by the cam member presses the jaw assembly 76 and the support ring 80 against the bias of the belleville springs 82 until the jaw assembly secures the data disk into position against the spindle 74.

Figure 5:
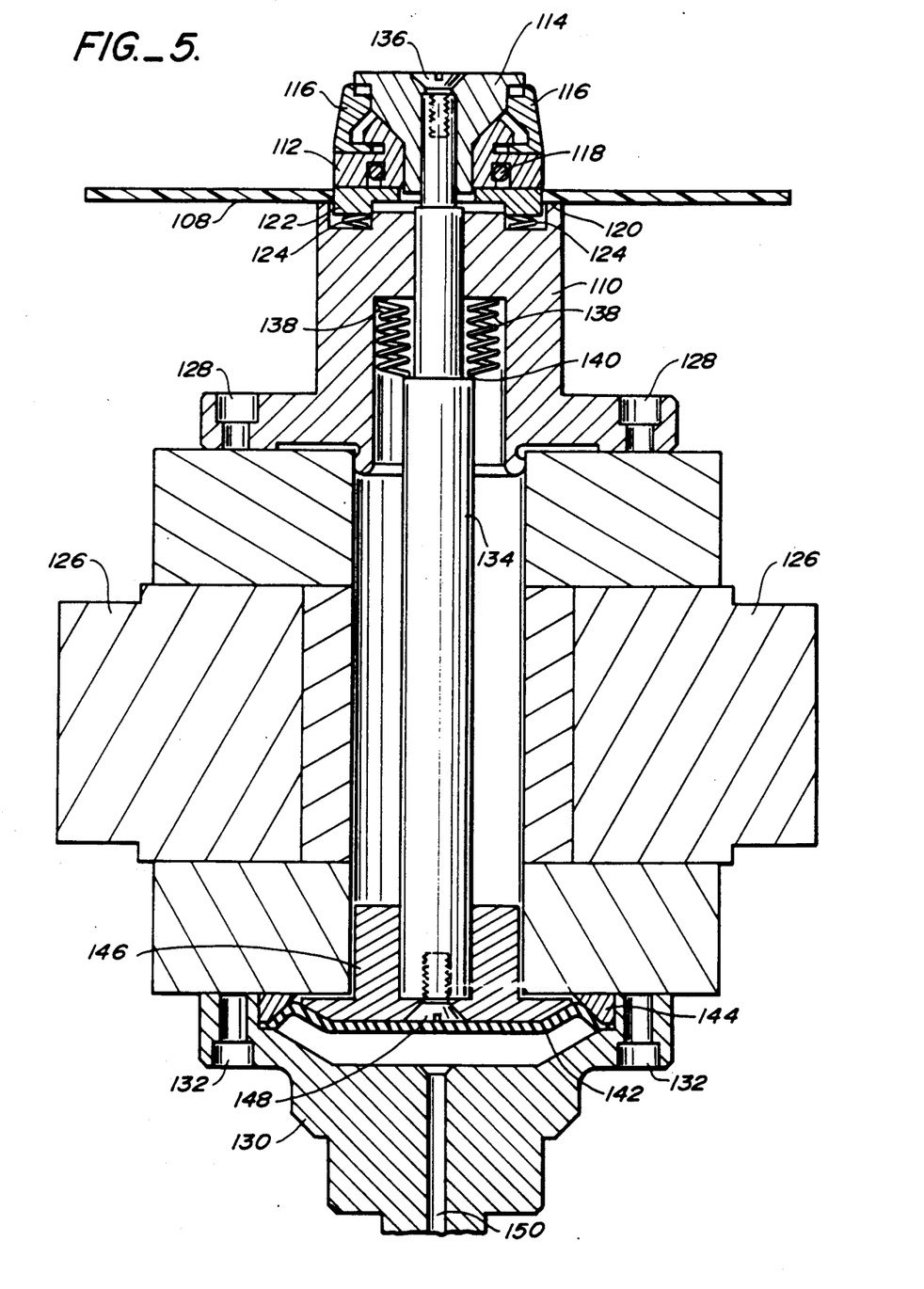
FIG. 5 is a side sectional view of a third embodiment of a spindle clamping apparatus in accord with the present invention
Figure 6:
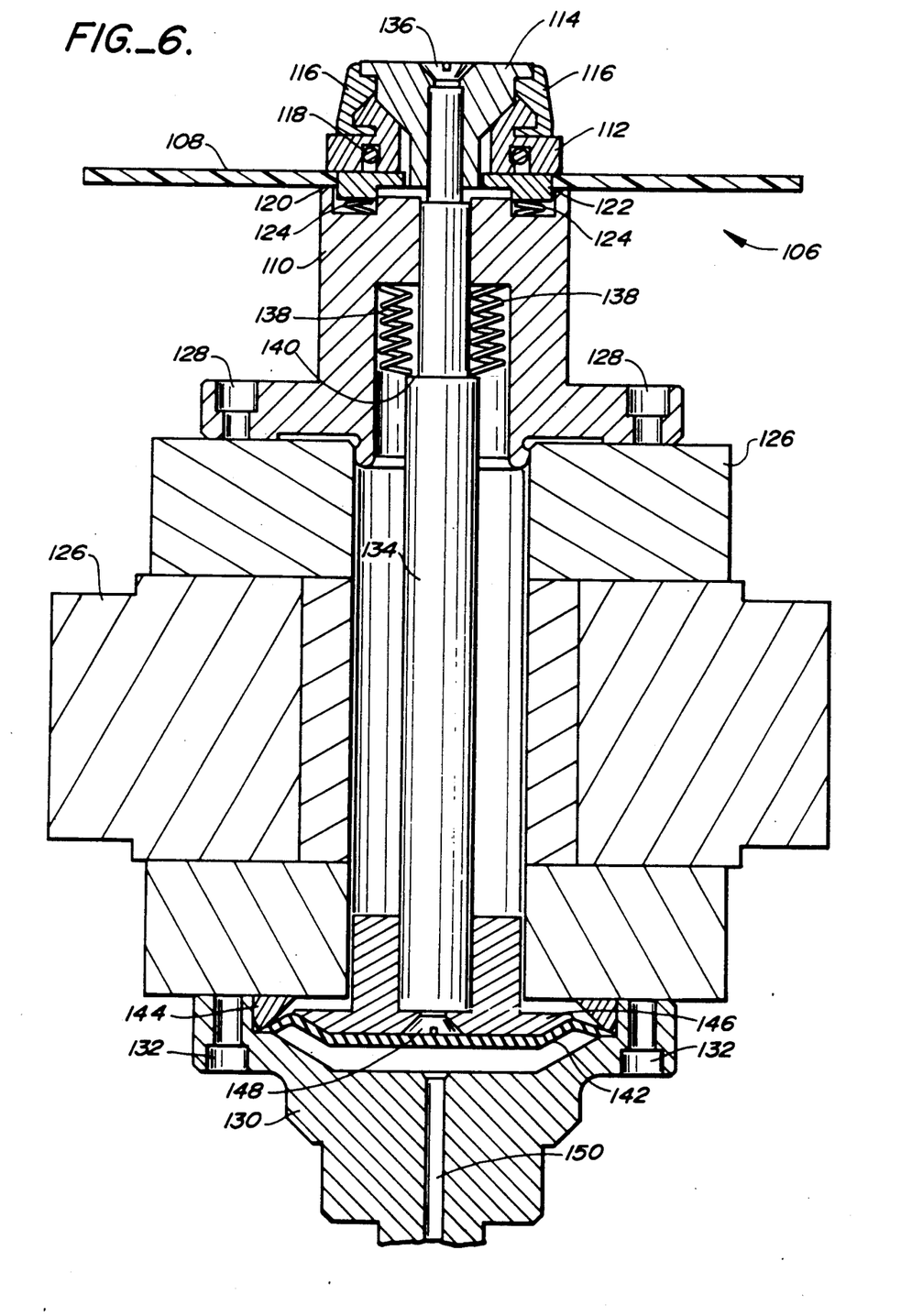
FIG. 6 is a side sectional view of the apparatus of FIG. 5 shown in a disk-releasing position.

FIGS. 5 and 6 illustrate a third embodiment of the present invention, with FIG. 5 showing a spindle clamp 106 in a disk-releasing position while FIG. 6 shows the spindle clamp in a disk-clamping position. The spindle clamp includes a spindle 110, a jaw assembly 112, a cam member 114 and a load transfer member 116, all of which are the functional equivalents to the corresponding members described in the embodiments above. The jaw assembly 112 is a segmented annular array of jaw pieces that are biased into a side-by-side position by an O-ring spring 118.

Unlike the embodiments above, the uppermost surface 120 of the spindle 110 is not segmented. Instead, the uppermost surface 120 is planar and acts as a disk-seating surface A data disk 108 is centered on the spindle 110 by a support ring 122 which has an outside diameter only slightly less than the inside diameter of the data disk. The support ring 122 is biased upwardly by belleville rings 124. The belleville springs push both the support ring and the jaw assembly 112 upwardly so that the jaw assembly does not chafe against the data disk as the jaw assembly is moved from the disk-releasing position to the disk-clamping position.

The spindle 110 is fixed to a turntable 126 at apertures 128 in the base of the spindle. Only a few of the apertures 128 in an array of apertures are aligned with internally-threaded holes, not shown, in the turntable to receive fastening bolts. In a like manner, a nozzle member 130 beneath a turntable 126 includes apertures 132 for securement of the nozzle member to internally-threaded holes, not shown, in the the turntable.

The cam member 114 of the spindle clamp 106 is fastened to a draw bar 134 which passes through the axis of the turntable 126. The draw bar 134 has a threaded axial bore, into which a fastening screw 136 is tightened. A spring stack 138 within the spindle 110 contacts a shoulder 140 of the draw bar to bias the spindle clamp into the disk-clamping position of FIG. 6. However, actuation of a diaphragm piston 142 overcomes the bias of the spring stack 138 to selectively move the spindle clamp into the disk-releasing position of FIG. 5. The diaphragm piston is a resilient material having a periphery that is pinched against the nozzle member 130 by a clamping ring 144. A metallic piston 146 is adhered to the diaphragm piston and is coupled to the draw bar 134 by a fastening screw 148. Thus, movement of the diaphragm 142 is translated to the cam member 114 of the spindle clamp 106 via the draw bar.

As noted above, the spring stack 138 biases the draw bar 134 into the disk-clamping position of FIG. 6. The spring stack is a plurality of belleville springs, with the precise number depending upon the desired biasing force. The bias of the spring stack 138 may be overcome by injection of air through a gas passageway 150 of the nozzle member 130. The injection of air through the gas passageway provides a pressure within the chamber formed between the nozzle member 130 and the diaphragm piston 142. A sufficient pressure within this chamber moves the draw bar 134 upwardly until the disk-releasing position is reached.

In operation, with the spindle clamp 106 in the disk-releasing position of FIG. 5, a data disk 108 may be freely brought to rest on the uppermost surface 120 of the spindle 110. The uppermost surface 120 has a diameter which exceeds the inside diameter of the data disk and acts as a disk-seating surface. The support ring 122, on the other hand, has a diameter which is only slightly less than the inside diameter of the data disk, so as to center the data disk on the spindle.

After seating of the data disk 108, air is evacuated through the gas passageway 150 of the nozzle member 130 in order to relieve the pressure against the diaphragm piston 142. Release of pressure causes the draw bar 134 to move downwardly as gravitational force and the bias of the spring stack 138 combine to overcome the decreasing pressure. The cam member 114 descends with the draw bar to exert a force against the jaw assembly 112. The wedge surface of the jaw assembly slides against the wedge surface of the cam member 114, thereby pushing the individual pieces of the jaw assembly radially outwardly along the support ring 122. The belleville springs 124 hold the support ring 122 in a raised condition so that the jaw assembly does not normally contact the upper surface of the data disk 108. However, as the jaw assembly reaches the disk-clamping position of FIG. 6, the cam member 114 bears against the load transfer member 116 to lower the support ring 122 and allow the jaw member 112 to clamp the data disk 108 against the spindle 110. Rotation of the spindle then is translated to the data disk.

The spindle clamp of the present invention securely supports and releases a data disk without requiring a robotic arm apparatus. It will, of course, be recognized that the spindle clamp is capable of securely clamping a data disk regardless of the clamp's orientation, so that while the above operation of the clamp has been described with the clamp in an upright orientation, the clamp works equally well when turned sideways or upside down. Moreover, while the present invention has been explained with reference to a quality control testing application, the spindle clamp may be used in other disk-clamping applications.

I claim:

1. A spindle clamp for removably supporting a disk comprising,
   a spindle having a rotational axis and a disk-seating surface perpendicular to said rotational axis,
   means for driving said spindle about said rotational axis,
   a jaw assembly axially coupled to said spindle proximate to said disk-seating surface, said jaw assembly being radially expandable,
   a cam member in frictional contact with said jaw assembly for exerting a radially expandable force thereon as said cam member is moved parallel to said rotational axis in a direction towards said disk-seating surface,
   means for selectively moving said cam member parallel to said rotational axis from a disk-clamping position to a disk-releasing position, and
   a load transfer member disposed between said jaw assembly and said cam member, said load transfer member being forced downwardly against said jaw assembly as said cam member nears said disk-clamping position.

2. The spindle clamp of claim 1 wherein said cam member has a wedge surface oblique to said rotational axis, said wedge surface being in frictional contact with said jaw assembly for exerting a radially expandable force on said jaw assembly.

3. The spindle clamp of claim 1 wherein said jaw assembly is a segmented annular array of jaw pieces having a means for biasing said jaw pieces in a side-by-side condition.

4. The spindle clamp of claim 2 wherein said jaw assembly has a bearing surface conforming to said wedge surface of the cam member.

5. An apparatus for clamping a removable disk comprising,
   a spindle adapted for rotation about a rotational axis, said spindle having a disk-seating surface perpendicular to said rotational axis,
   a cam member positioned above said disk-seating surface, said cam member including a wedge portion having a first bearing surface sloped relative to said rotational axis,
   a jaw assembly disposed between said disk-seating surface and said cam member, said jaw assembly having a second bearing surface in frictional engagement with the first bearing surface of the cam member,
   means for axially moving said cam member from a raised disk-releasing position to a lowered disk-clamping position, thereby causing displacement of said jaw assembly in a direction parallel to said disk-seating surface of the spindle as said sloped first bearing surface bears against the jaw assembly, said displacement of the jaw assembly being radially outward relative to said rotational axis, and
   a load transfer member at least partially positioned between said cam member and said jaw assembly, said load transfer member being in force-transmitting communication with said cam member and said jaw assembly when the cam member is in said disk-clamping position, yet being in axially spaced relation to one of said cam member and said jaw assembly when the cam member is in the disk-releasing position.

6. The apparatus of claim 5 further comprising means for biasing said cam member in the disk-releasing position.

7. The apparatus of claim 5 wherein said jaw assembly includes a plurality of jaw pieces, each having a second bearing surface, said jaw pieces forming an annular configuration when in side-by-side relation, adjacent jaw pieces being spaced apart by said vertical movement of the cam member towards said disk-clamping position, said jaw assembly having means for biasing the jaw pieces into said annular configuration.

8. The apparatus of claim 7 wherein said disk-seating surface of the spindle is annular and wherein said spindle includes an annular raised surface concentric to, but smaller in diameter than, said raised surface having a diameter substantially equal to the diameter of the annular configuration of the jaw pieces in side-by-side relation, said radially outward displacement of the jaw assembly causing the outer extremities of the jaw pieces to project over said recessed disk-seating surface.

9. The apparatus of claim 5 wherein said first bearing surface has an inverted and truncated conical configuration.

10. The apparatus of claim 9 wherein said second bearing surface conforms to said first bearing surface.

11. The apparatus of claim 7 wherein said means for biasing the jaw pieces is a plurality of springs, adjacent jaw pieces joined by one of said springs.

12. The apparatus of claim 7 wherein said means for biasing the jaw pieces is an O-ring.

13. The apparatus of claim 5 wherein said jaw assembly is made of an elastically deformable material.

14. A spindle clamp for removably supporting a disk having a central aperture of a predetermined inside diameter and having a height at the circumference of said central aperture, comprising,
- a spindle having a rotational axis and a planar raised surface perpendicular to said rotational axis, said raised surface having an annular configuration of a first diameter that is less than the inside diameter of a disk, said spindle having a planar recessed disk-seating surface concentric with said raised surface, said disk-seating surface having an annular configuration of a second diameter that is greater than the inside diameter of said disk, the planes defined by said raised surface and said disk-seating surface being spaced apart by a distance at least as great as the height of said disk,
- an annular jaw assembly adjacent to said raised surface, said first diameter of the raised surface being substantially equal to the diameter of said jaw assembly, a radially inward portion of the jaw assembly being a truncated conical bearing surface, said jaw assembly having a plurality of substantially identical jaw pieces and a means for biasing said jaw pieces in a side-by-side relation,
- a cam member adjacent to said jaw assembly opposite said spindle, said cam member having a wedge surface in frictional engagement with said bearing surface of the jaw assembly,
- means for selectively moving said cam member along said rotational axis from a disk-releasing position to a disk-clamping position, said frictional engagement of the wedge surface with the bearing surface thereby providing displacement of each jaw piece in a direction perpendicular to said rotational axis, and
- a load transfer member having a portion spatially situated between said cam member and said jaw assembly, said portion spaced apart from the cam member when the cam member is in the disk-releasing position, yet contacting said cam member when in a disk-clamping position.

15. The spindle clamp of claim 14 wherein said raised surface and said disk-seating surface of the spindle are spaced apart by an intermediate spindle surface having a diameter greater than the first diameter and less than said second diameter, thereby forming a gap.

16. The spindle clamp of claim 15 wherein said jaw pieces are made of an elastically deformable material, said gap permitting deformation of the jaw pieces when said cam member is in the disk-clamping position.

17. The spindle of claim 14 wherein the means for biasing said jaw pieces is a plurality of springs, each spring connecting adjacent jaw pieces.

18. The spindle of claim 14 wherein the means for biasing said jaw pieces is an O-ring encircling a portion of each jaw piece.

19. The spindle clamp of claim 14 wherein each jaw piece has a flat clamping face abutting said raised surface of the spindle, said clamping face further abutting a disk when said cam member is moved into said disk-clamping position.

20. The spindle clamp of claim 14 wherein said bearing surface of the jaw assembly has a truncated conical configuration which is inverted relative to said spindle, said wedge surface of the cam member conforming to said bearing surface.

21. The spindle clamp of claim 14 wherein said cam member is spring biased into said disk-releasing position.

22. The spindle clamp of claim 14 wherein said means for selectively moving the cam member is a pneumatically controlled assembly.

23. The spindle clamp of claim 14 wherein said planes defined by said raised surface and said disk-seating surface are spaced apart by the sum of the height of the disk and a distance of at least one mil.

* * * * *